United States Patent

[11] 3,627,329

| [72] | Inventor | William A. Jacobs |
| | | Manhattan Beach, Calif. |
| [21] | Appl. No. | 781,491 |
| [22] | Filed | Dec. 5, 1968 |
| [45] | Patented | Dec. 14, 1971 |
| [73] | Assignee | Mattel, Inc. |
| | | Hawthorne, Calif. |

[54] TURNTABLE GOVERNOR DRIVE SYSTEM
12 Claims, 4 Drawing Figs.

[52] U.S. Cl.................................................. 274/9 R,
274/1 A
[51] Int. Cl...................................................... G11b 25/04
[50] Field of Search........................................... 274/1.1,
1.3, 1.4, 1.5, 1.6, 39.1; 74/801; 188/184

[56] References Cited
UNITED STATES PATENTS
1,116,680  11/1914  Davy............................ 188/184

| 3,477,728 | 11/1969 | Lindsay et al................. | 274/1.1 |
| 2,034,888 | 3/1936 | Wilhelm........................ | 274/1 |
| 3,165,320 | 1/1965 | Ryan............................ | 274/1 |
| 3,222,954 | 12/1965 | Wuettz......................... | 74/801 |
| 3,469,470 | 9/1969 | Gaudry......................... | 74/443 |

FOREIGN PATENTS

| 849,493 | 7/1949 | Germany....................... | 274/39.1 |
| 169,127 | 8/1959 | Finland........................ | 274/39.1 |

Primary Examiner—Leonard Forman
Assistant Examiner—Steven L. Stephan
Attorney—Seymour A. Scholnick ABSTRACT: A mechanism useful in toy phonographs for driving a governor from the record turntable comprising three planetary discs of elastomeric material rotatably mounted on the turntable at different positions around its axis. The rims of the discs are engaged with a large stationary raceway, and with the small hub of a governor, to drive the governor at a high speed.

PATENTED DEC 14 1971 3,627,329

INVENTOR
WILLIAM A. JACOBS

BY Max E. Shirk
ATTORNEY

TURNTABLE GOVERNOR DRIVE SYSTEM

BACKGROUND OF THE INVENTION

1. Field of the Invention

This invention relates to toys and more particularly to speed-changing transmissions for phonograph toys.

2. Description of the Prior Art

Dolls and other toys are sometimes equipped with phonographs for playing short sayings. The phonograph turntable is typically driven by a spring, and a rotating governor is employed to maintain a constant slow turntable speed. Moderate governor sensitivity generally requires that the governor rotate at a high speed, so a transmission is required to convert the slow turntable speed to a high governor speed.

The most common type of speed-increasing transmission employs a gear train. However, gear trains are noisy, and the noise would be further amplified by the acoustical construction of the phonograph. Belt couplings have been used, but they generally require high tension which leads to rapid wear and danger of breakage, particularly where a large speed increase is to be achieved in one coupling stage by using a very small pulley on the governor. Furthermore, as the size of the phonographs decreases, the size of the drive belts become critical and it is difficult to economically manufacture belts with the required close tolerance to assure a speed within a given range such as 6 percent of the optimum design level.

OBJECTS AND SUMMARY OF THE INVENTION

An object of the present invention is to provide an improved transmission apparatus for use in phonograph toys.

Another object is to provide a simple speed-changing mechanism for coupling a toy phonograph turntable to a governor.

In accordance with the present invention, a speed-changing mechanism is provided which is suitable for use in toys. The mechanism comprises a slow wheel, such as a phonograph turntable, and several planetary discs rotatably mounted on the wheel at different positions around its center. As the wheel turns, the planetary discs roll along a large stationary raceway that surrounds the discs. A high-speed member, such as a governor, is rotatably mounted on the same axis as the wheel, and it has a hub portion engaged with the planetary discs to enable them to drive it. The discs are constructed of a resilient material such as rubber, and they are frictionally engaged with the raceway and the high-speed member.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
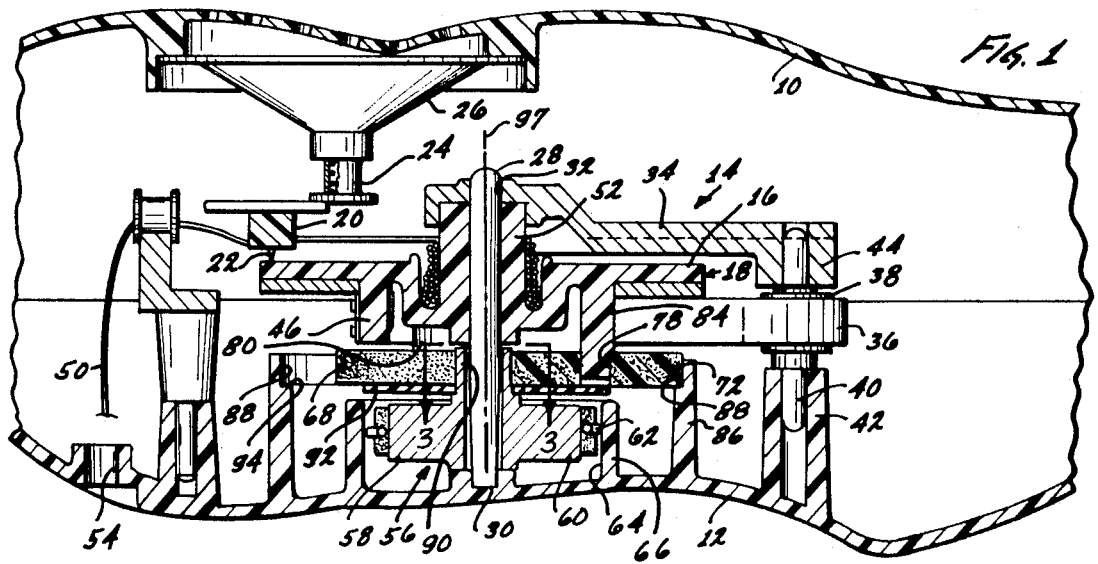
FIG. 1 is a sectional view of a toy phonograph constructed in accordance with the invention, shown in a doll housing.
Figure 2:
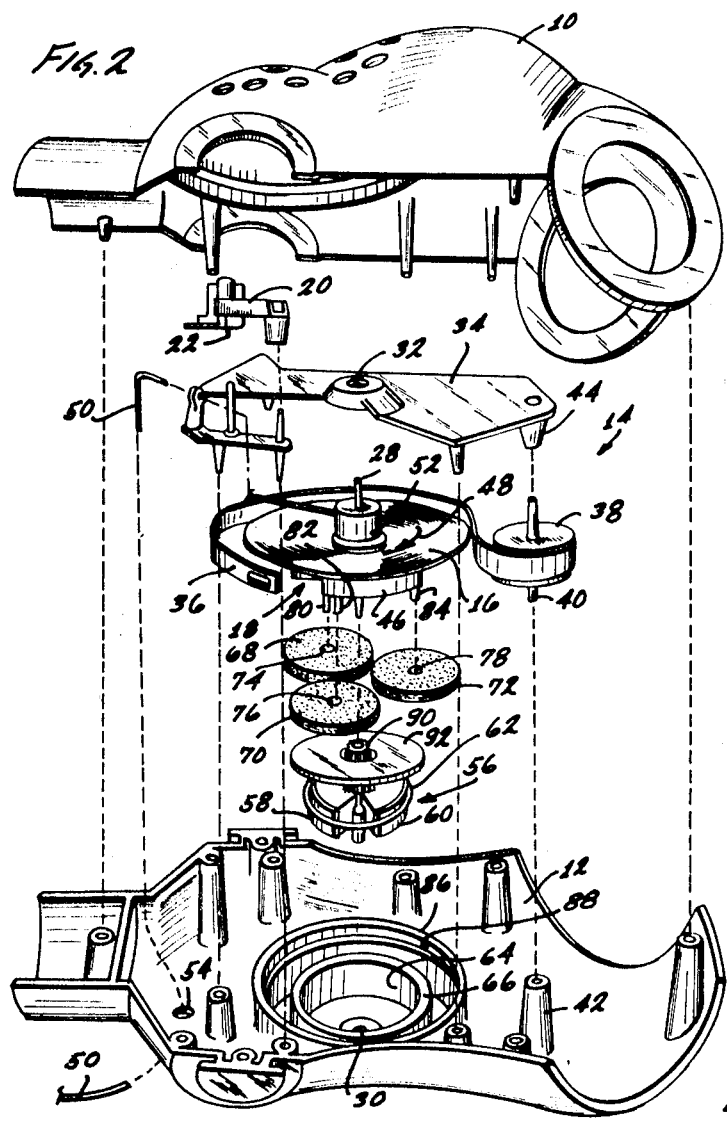
FIG. 2 is an exploded view of the phonograph of FIG. 1.

FIGS. 1 and 2 show the front portion 10 and rear portion 12 of a doll housing which contains a toy phonograph 14 constructed in accordance with the invention. The phonograph includes a record portion 16 formed in a wheel or turntable 18, the record having several parallel spiral record grooves therein that define different sound recordings. A tone arm 20 has a needle 22 engaged with one of the spiral grooves to play the record. The tone arm bears against an armature 24 of a speaker cone 26 that acoustically amplifies the sound.

The turntable 18 is fixed to a shaft 28 that is rotatably engaged at one end with a doll housing bearing 30, and at the other end with a bearing 32 in a cover plate 34. Power for rotating the turntable during playing is provided by spring 36. The spring can be wound onto and off from a barrel 38 that has a shaft 40 rotatably engaged with bearings 42 and 44 on the doll housing and cover plate, respectively. Prior to playing the record, the spring must be wound off the barrel and around a cylinder portion 46 of the turntable. The spring then rotates the turntable in the direction of arrow 48 to play the record while the spring is rewound on the barrel 38.

The winding of the spring on the cylinder portion 46 of the turntable is accomplished when a child pulls on a string 50 whose inner end has many turns around a drum portion 52 of the turntable. Pulling on the string turns the turntable to unwind the string therefrom and to wind the spring 36 thereon. The string extends through a hole in the tone arm 20 to move the needle to the outer edge of the record as the string is pulled. The string also extends through the cover plate 34 and an opening 54 in the doll housing. As soon as the child has pulled the string, he releases it to allow the spring to turn the turntable and play the record.

In order to assure constant slow rotation, such as 2 revolutions per second, of the turntable 18 by the spring, a governor 56 is employed which is coupled to the turntable. The governor is rotatably mounted in the shaft 28 which supports the turntable. The governor has a pair of weights 58 and 60 which are held in by a spring 62, but which fly out by centrifugal forces when the governor reaches a high speed. When the weights fly out, they bear against the governor raceway surface 64 of a ring-shaped raceway member 66, producing friction that slows the governor. The coupling of the turntable 18 to the governor 56, in an economical and quiet manner that also assures close speed regulation, is a principal feature of this invention.

In accordance with the invention, the turntable is coupled to the governor to drive it at a high speed by a planetary drive. The drive or transmission includes three planetary discs members 68, 70 and 72 constructed of elastomeric material. Each disc has a center aperture 74, 76, 78 engaged with a short projection of trunnion 80, 82, 84 on the turntable. Another raceway member 86 has a raceway 88 for engaging the outer surface of the three planetary discs. As the turntable 18 rotates clockwise, the raceway 88 causes each disc to rotate counterclockwise at a higher speed than the turntable.

The governor 56 has a hub portion 90 which is engaged with the perimeter portion of the three planetary discs. As the turntable 18 rotates, causing the planetary discs to rotate somewhat faster, the discs drive the governor 56 at a relatively high speed, such as 10 times the turntable speed. Thus, the planetary discs 68, 70 and 72 couple the turntable to the governor 56, to rotate the latter high-speed member at a high speed.

In order to prevent the discs from falling out of the turntable trunnions, a thin retainer disc 92 is provided which is disposed about the governor hub. To further retain the planetary discs, the disc raceway member 86 is provided with a ledge 94 which retains the outer edges of the discs.

Figure 3:
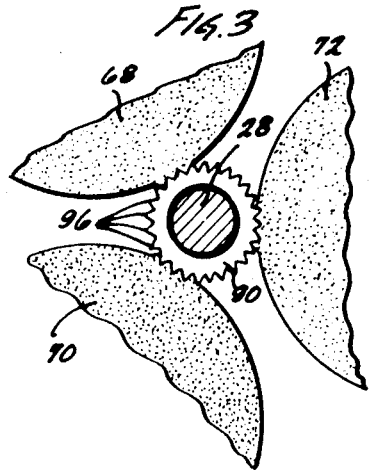
FIG. 3 is an enlarged partial sectional view taken on the line 3—3 of FIG. 1, showing the governor hub and planetary discs engaged therewith.

Good frictional engagement between the planetary discs and both the disc raceway 88 and governor hub portion 90 is promoted by the use of relatively soft resilient or elastomeric material such as 70 to 80 shore hardness rubber or vinyl. In addition, the hub 90 is provided with knurls or protuberances 96, shown in Fig. 3, in the form of splines or serrations that indent slightly into the disc perimeters. The discs must bear with appreciable force against the raceway and hub. To this end the diameter of the discs is slightly greater than the difference in radius between the raceway 88 and hub portion 90, which causes the discs to become compressed slightly. The apertures 74, 76 and 78 of the discs are large enough so that even with slight deformation and shifting, the discs rotate freely on the turntable trunnions. The discs are spaced uniformly about the axis 97 of the turntable wheel 18 and governor hub 90 (at 120° spacings for three discs), so that the net radial force on the hub is substantially zero and it turns freely about the shaft 28.

The planetary drive mechanism provides a transmission that is relatively free from gear-type noise that would be amplified by the speaker cone 26, and which is free from the high stresses occurring in small belt drives. The transmission is compact, since the governor and turntable are on the same axis, permitting its use in small dolls. Yet the transmission assures a closely predictable large speed increase from the turntable to the governor, even with the substantial tolerances employed in low-cost mass production.

Figure 4:
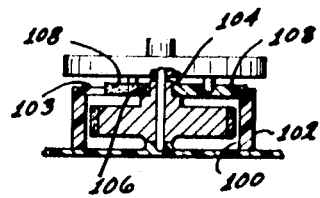
FIG. 4 is a partial sectional view of a toy phonograph constructed in accordance with another embodiment of the invention.

FIG. 4 shows a planetary transmission similar to the foregoing design, but wherein a governor raceway 100 is incorporated into the planetary disc raceway member 102 that has a planetary raceway 103. Also, the governor hub 104 is provided with a ledge 106, to support the discs 108, to thereby eliminate the need for a separate retaining member. These represent changes which can sometimes reduce the cost of manufacture.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. A sound-reproducing toy comprising:
a rotatable wheel having a predetermined axis of rotation and a record disc thereon;
means defining a fixed raceway concentric with the axis of said wheel;
a high-speed governor member rotatably mounted concentric with said axis of said wheel and closely adjacent the same, said high-speed member having a hub portion with a diameter substantially smaller than the diameter of said raceway; and
at least one planetary member of elastomeric material rotatably mounted on said wheel, said member frictionally engaged with said raceway and engaged with said high-speed governor member.

2. The toy described in claim 1 wherein:
said planetary member comprises a disc of elastomeric material with a diameter greater than the difference in radius between said raceway and said hub portion of said high-speed member.

3. The toy described in claim 1 having:
a plurality of planetary members of elastomeric material, each having a diameter greater than the difference in radius between said raceway and said hub portion of said high-speed member, said planetary members spaced substantially uniformly about said axis of said wheel to provide a minimum net radial force to said high-speed member.

4. The toy described in claim 1 wherein:
said wheel includes a phonograph record mounted thereon, and a tone arm engaged with said record.

5. A toy for playing a record comprising:
a housing:
a wheel rotatably mounted on said housing for moving said record;
means for engaging said record to reproduce a sound recorded thereon;
means defining a raceway concentric with the axis of rotation of said wheel;
at least one planetary member having a center portion rotatably coupled to said wheel at a position spaced from the axis of said wheel, and having a circular surface portion of elastomeric material engaged with said raceway; and
a governor rotatably mounted concentrically with the axis of said wheel and engaged with said planetary member.

6. The toy described in claim 5 wherein:
said governor has a drive hub portion; and a plurality of said planetary members with at least rim portions of elastomeric material, each mounted at a different position around said wheel axis and each having an edge rollably engaged with said raceway and said drive hub portion of said governor.

7. The toy described in claim 5 wherein:
governor has a drive hub portion of predetermined diameter; and
a plurality of said planetary members with at least rim portions of resilient material, the diameter of each disc being slightly greater than the difference in radius between said raceway and said hub portion of said governor, and each loosely rotatably mounted on said wheel to permit slight radial shifting with respect to the axis of said wheel.

8. A toy phonograph comprising:
a rotatably mounted turntable for holding a record;
means for engaging a record on said turntable, to produce sounds;
means for rotating said turntable;
a plurality of resilient planetary members, each rotatably carried by said turntable at positions uniformly spaced about the axis of said turntable;
means defining a raceway extending around said planetary members frictionally engaging said planetary members; and
a governor rotatably mounted coaxially with said turntable, said governor having a hub portion engaging said planetary members.

9. The toy described in claim 8 wherein:
planetary members have elastomeric rim portions with substantially smooth surfaces; and
said hub portion of said governor has a plurality of protuberances for indenting into said surface of said planetary members to engage them.

10. The toy described in claim 8 wherein:
said raceway defines a ledge for retaining said planetary members against movement axially toward said governor.

11. The toy described in claim 8 wherein:
said raceway defines a ledge for retaining said planetary members against movement axially toward said governor, and also defines a governor-engaging raceway extending concentrically about said governor; and
said governor has arms for centrifugal movement outward against said governor-engaging raceway.

12. In a phonograph toy including housing means, a phonograph record rotatably mounted in said housing means, said record having sounds recorded thereon, record-rotating means mounted in said housing means for moving said record, sound-reproducing means for reproducing said recorded sound and a governor for controlling the speed of said record, improved means for drivingly connecting said governor to said record, comprising:
means defining a raceway concentric with the axis of rotation of said record;
trunnion provided in said housing means
one of said raceway and trunnion means being carried by said record and the other fixed to said housing;
at least one rotary member rotatably mounted on said trunnion means and having a smooth, circular surface portion of elastomeric material engaged with said raceway for rotating said at least one rotary member when said trunnion means and said raceway are rotated with respect to each other by said record-rotating means; and
said governor being rotatably mounted concentrically with said axis of said record and being drivingly engaged with said rotary member.

* * * * *

UNITED STATES PATENT OFFICE
CERTIFICATE OF CORRECTION

Patent No. 3,627,329    Dated December 14, 1971

Inventor(s) William A. Jacobs

It is certified that error appears in the above-identified patent and that said Letters Patent are hereby corrected as shown below:

Column 4, line 10, before "governor" should read -- said --; line 33, before "planetary" should read -- said --; line 58, after "trunnion" should read -- means --.

Signed and sealed this 7th day of November 1972.

(SEAL)
Attest:

EDWARD M.FLETCHER,JR.        ROBERT GOTTSCHALK
Attesting Officer            Commissioner of Patents